April 10, 1951  J. DOLEJS, SR  2,548,355
FISHING LINE FLOAT
Filed March 11, 1948
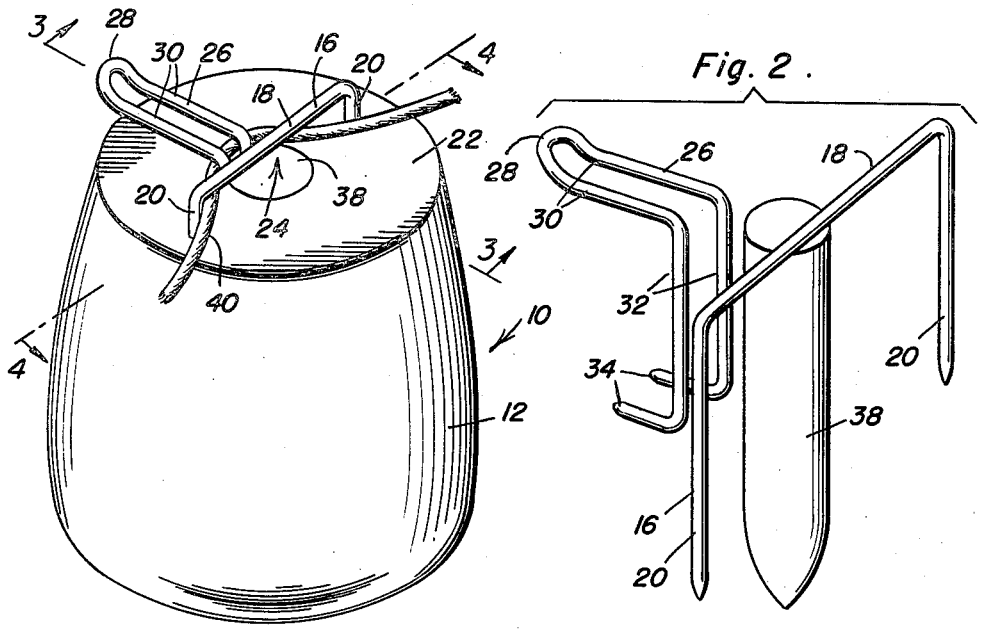
Fig. 1.
Fig. 2.
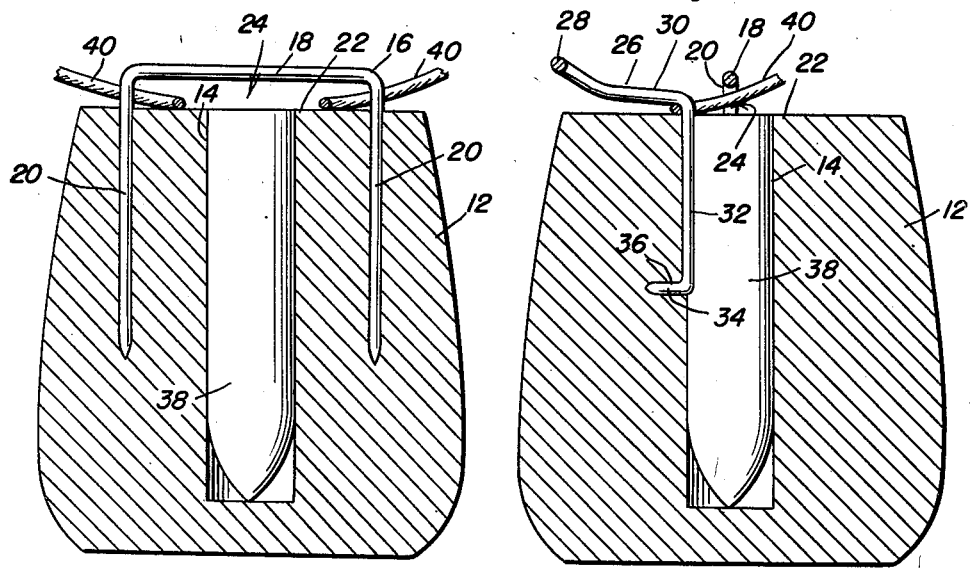
Fig. 3.
Fig. 4.
Joseph Dolejs Sr.
INVENTOR.

Patented Apr. 10, 1951

2,548,355

UNITED STATES PATENT OFFICE 2,548,355

FISHING LINE FLOAT

Joseph Dolejs, Sr., Antigo, Wis.

Application March 11, 1948, Serial No. 14,195

1 Claim. (Cl. 43—44.95)

This invention relates to new and useful improvements and structural refinements in floats for fishing lines, and the principle of the invention is to facilitate secure attachment of the float at any point along the fishing line, but at the same time, to permit adjustment of the float along the line as desired, in accordance with the particular fishing conditions, such as, depth of water and the like.

This object is achieved by the provision of a fishing line float which includes a buoyant body provided with a resilient clip, the fishing line being frictionally engageable with the clip so that the float is firmly and securely retained in the predetermined position on the line, but at the same time, by simply disengaging the line from the clip, the position of the float may be varied, as desired.

An important feature of the invention lies in the provision of a staple on the float body, the purpose of the staple being to guide and retain the fishing line in engagement with the resilient retaining clip.

Another feature of the invention resides in the provision of a removable filler plug in the float body for retaining the resilient clip in position, so that by simply removing the plug, removal of the clip is facilitated for purposes of inspection, replacement or repair.

An additional feature of the invention resides in the provision of a fishing line float which is simple in construction, convenient in operation, which will readily lend itself to economical manufacture, and the use of which will not damage or otherwise mutilate the fishing line.

With the above more important objects in view, and such other objects as may become apparent as this specification proceeds, the invention consists essentially of the arrangement and construction of parts as illustrated in the accompanying drawings, in which:

Figure 1 is a perspective view of the invention;

Figure 2 is an exploded perspective view of a staple, clip and a plug used in the invention;

Figure 3 is a cross-sectional view, taken substantially in the plane of the line 3—3 of Figure 1; and Figure 4 is a cross-sectional view taken substantially in the plane of the line 4—4 of Figure 1.

Like characters of reference are employed to designate like parts in the specification and throughout the several views.

Referring now to the accompanying drawings in detail, the invention consists of a fishing line float designated generally by the reference character 10, the same embodying in its construction a buoyant body 12, configurated substantially as shown, and provided with a blind, axial bore 14.

A substantially U-shaped line guiding member or staple 16, including a transverse bar 18 and a pair of spaced parallel prongs 20, is secured to the body 12, this being accomplished by embedding the prongs 20 in the body in such manner that the bar 18 of the staple is spaced with respect to the flat upper surface 22 of the body and coacts therewith to form what may be referred to as an elongated opening or slot 24. It should be also noted that the bar 18 of the staple 16 extends diametrically across the bore 14, substantially as shown.

A resilient retaining clip 26 is also attached to the body 12, the clip 26 being formed integrally from one piece of wire rod which is doubled upon itself to provide a bight portion 28, a pair of spaced parallel arms 30, and a pair of angulated prongs 32 which, in turn, terminate in a pair of laterally angulated keepers 34. This particular configuration of the clip 26 is best illustrated in the accompanying Figure 2.

The prongs 32 of the clip 26 are receivable in the bore 14 of the body 12 with the keepers 34 thereof engaging suitable apertures 36 which extend laterally from the bore 14, and which are drilled in the body 12 by a tool entering the bore 14 while the arms 30 are disposed adjacent the surface 22 of the body with the bight portion 28 of the clip angulated outwardly, as illustrated in Figure 3.

A cylindrical filler block 38 is receivable in the bore 14 in frictional contact with the prongs 32, whereby the entire clip 26 is firmly and securely held in position.

When the invention is placed in use, a fishing line 40 is doubled upon itself intermediate of its length so as to provide what may be referred to as a loop, which loop is, in turn, passed through the opening or slot 24 and under the arms 30 of the clip 26, which are intended to frictionally engage the fishing line. It is to be noted that the arms 30 of the clip 26 extend substantially at right angles to the bar 18 of the staple 16, and after the looped fishing line is engaged with the clip 26, the portions of the line at the sides of the loop are simply pulled in relatively opposite directions, so that the line is firmly and securely held by the clip, as is shown in Figure 1.

By virtue of the structural arrangement, the entire float 10 will be firmly held in a predetermined position on the fishing line, but when it is desired to readjust the position of the float, it is accomplished by simply disengaging the fishing line from the clip 26 and sliding the entire float on the line, as will be clearly apparent.

In the event that it is necessary to replace the clip 26 (if the clip should lose its resiliency or become otherwise mutilated), this may be accomplished by simply withdrawing the staple 16 and removing the plug 38 from the bore 14, whereupon the entire clip 26 may be easily and conveniently removed and replaced.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

A fishing float comprising a block-shaped body having a flat upper surface, a line guiding member including a straight bar having a pair of spaced prongs connecting the ends of said bar, said prongs embedded in and projecting upwardly from said body, said bar being spaced above and extending transversely of said surface, a central recess in said body, a resilient line engaging clip secured to said body having a pair of downwardly extending prongs extending into said recess, said clip extending substantially at right angles to the bar in closely spaced relation to said surface whereby a line clamped between the clip and said surface may be passed under said bar for engagement with the projecting portions of said spaced prongs to prevent disengagement of the line from said clip, and a filler block positioned in said recess in frictional engagement with said downwardly extending prongs in said body.

JOSEPH DOLEJS, Sr.

REFERENCES CITED

The following references are of record in the file of this patent:

UNITED STATES PATENTS

| Number | Name | Date |
|---|---|---|
| 816,264 | Soper | Mar. 27, 1906 |
| 2,127,667 | Pflueger | Aug. 23, 1938 |
| 2,236,215 | Klinitski | Mar. 25, 1941 |
| 2,257,415 | Gerdin | Sept. 30, 1941 |
| 2,293,800 | Brown | Aug. 25, 1942 |